United States Patent Office 3,317,736
Patented May 2, 1967

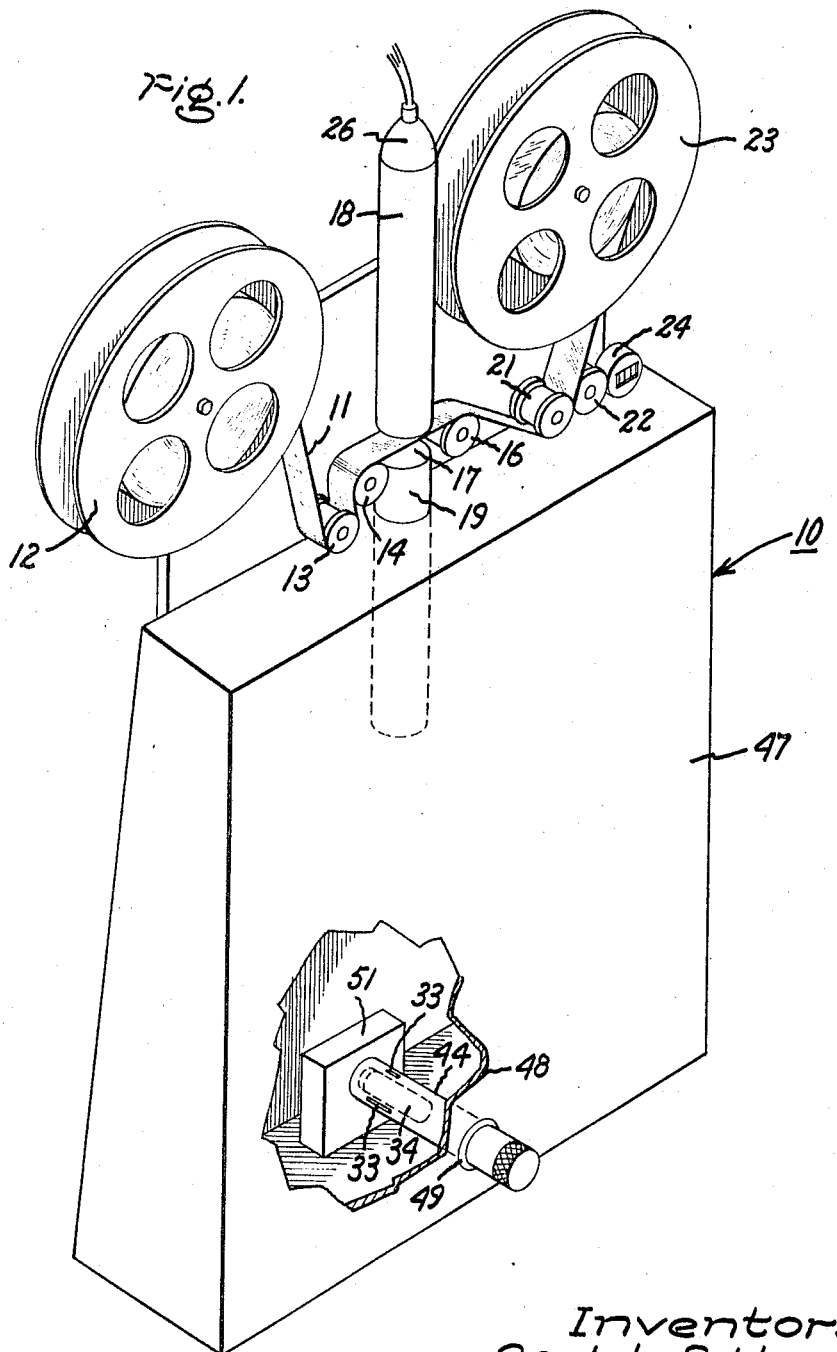

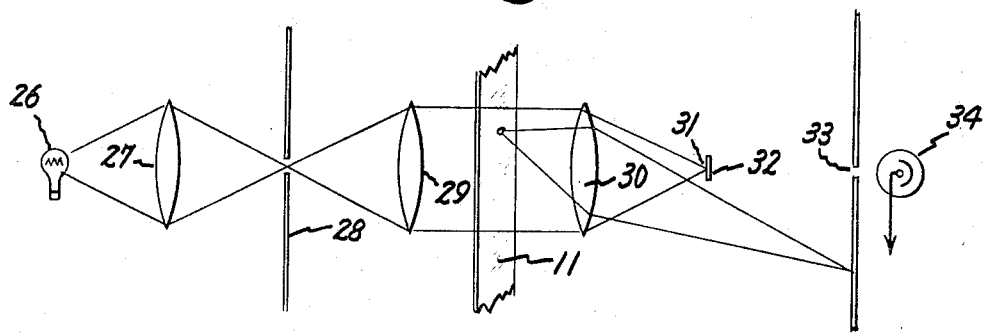
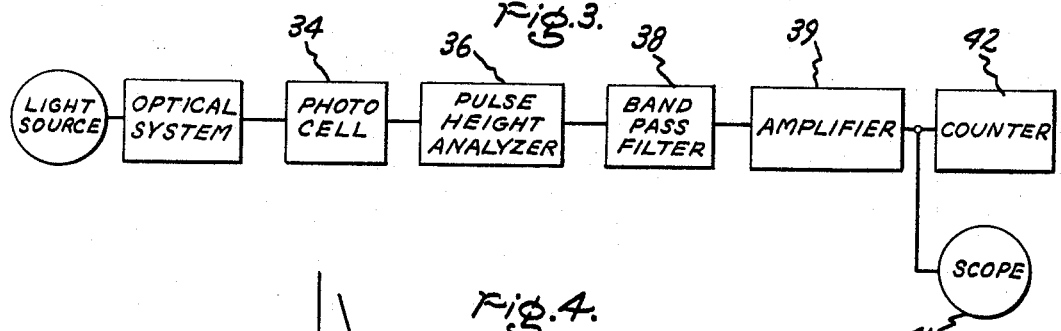
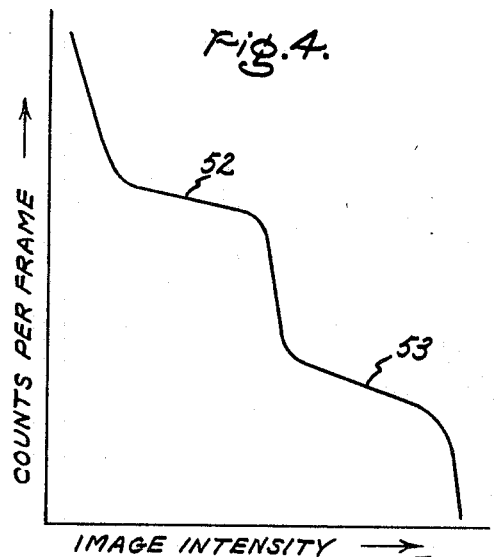

3,317,736
APPARATUS FOR MEASURING THE PROBABILITY OF THE PRESENCE OF OPTICAL BLEMISHES
Carlyle S. Herrick, Alplaus, and Harold R. Day, Jr., Fayetteville, N.Y., assignors to General Electric Company, a corporation of New York
Filed Nov. 12, 1963, Ser. No. 322,595
7 Claims. (Cl. 250—219)

This invention relates to an apparatus for automatically detecting and counting optical imperfections of microscopic size present in a web, particularly in a web of film to be employed as the base material in the production of thermoplastic tape, a high resolution recording medium projected with dark field optics.

Optical imperfections of microscopic size are present in even the highest quality present day film base. These blemishes, although they may be of little or no consequence in the conventional use of film as a photographic medium as for display on a screen or in the preparation of film records for the control of the operations of statistical machines, become extremely troublesome during optical read-out with a system wherein high resolution is employed and wherein the image on the web of which the films forms the base is projected through a dark field optical system.

Such is the case with thermoplastic tape generally comprising a three-layer structure; a base web, an electrically conducting layer and then a thermoplastic dielectric layer superimposed thereon. Intelligence is introduced to the dielectric layer in the form of an electrical charge (or other energy charge) pattern deforming the thermoplastic layer to varying degrees. These distortions form the basis for visible transmissibility of the intelligence by optical read-out. The image may be viewed by transmitted or reflected light to effect the optical read-out. In the case of transmitted light read-out, for example, a beam of light is passed through the web of thermoplastic tape and portions of this light are deflected by the distortions in the tape. By focusing this transmitted light on a screen with the use of dark field optics visible images of the impressed intelligence are produced. In the same manner that portion of the transmitted light which is caused to scatter by the presence of optical blemishes is likewise focused on the viewing screen along with the desired image as undesirable bright spots in the intelligence image. The presence of these bright spots is referred to as "optical noise."

When the brightness level of this optical noise is noticeable to the viewer's eye, the attention of the viewer is distracted and the proper reception of the intelligence being transmitted from the thermoplastic tape is hampered.

Therefore, to enable the successful commercial application of thermoplastic tape as an intelligence transmitting medium, a method and apparatus must be provided to insure the selection of a film base with the lowest level of optical noise. Further, the provision of such apparatus and suitable procedures will also enable the identification of those steps in the preparation of the thermoplastic tape wherein the manufacturing procedures are generating optical noise in the tape structure and increasing the overall optical noise level of the finished tape. When such production difficulties arise, once the source of the problem has been accurately identified, the defective equipment or procedure may be more readily improved.

A more complete description of the several operations employed in the manufacture of thermoplastic tape may be found in copending U.S. patent application Ser. No. 161,003, filed Dec. 21, 1961, in the name of Carlyle S. Herrick, now issued as U.S. Patent 3,201,275.

Conventional detection equipment employing both an optical system for illuminating a web and presenting to a photocell light energy indicative of a flaw in the web and an electrical circuit to register these indications is available for automatically determining the presence in and on a web of gross flaws as, for example, striations, creases, folds, scratches and flecks of imbedded foreign matter. However, such equipment would be of no value in determining the probability of the presence of optical blemishes of microscopic size about 0.1 mm. across, and smaller, in a web particularly with respect to the presence of such imperfections non-uniformly distributed on a tape or film. The reason for the inability of conventional detection equipment to discern the presence of discrete microscopic light scattering sites is the nature of the optical systems employed therein. In order to focus the images of such imperfections with sufficient contrast for their discrete detection it is necessary to employ dark field optics and, together therewith, detecting circuitry sensitive to the relatively low light intensity levels accompanying the scattered light from the optical blemishes. Although the individual components of the detecting system may be off-the-shelf items, the design of the overall system must have the latitude to detect as many as 500 blemishes per 16 mm. frame of film and as few as one blemish per ten frames of 16 mm. film. Knowing the task to be overcome in the aforementioned regard the selection of the circuitry components is relatively straight-forward.

However, the greatest problem lies in determining what input is to be presented to this detecting circuitry by the optical system for counting thereby and how such input is to be selected so as to provide a statistically valid and reproducible quantity to serve as a function of the blemish concentration over the entire surface of the web in spite of the non-uniform distribution of the optical blemishes.

Thus, given the equipment having the capabilities for discerning and detecting the presence of optical blemishes, this equipment cannot yield valid reliable information by simply scanning the breadth and length of a tape and producing a "total count" of blemishes for such results would not be representative of the true conditions. The detecting circuitry upon receiving a pulse of electric current from the photocell or similar photosensitive device has no way of distinguishing whether the burst of current in response to scattered light of a given intensity is representative of the presence of one or of several light scattering sites which produce images of smaller intensities thereby contributing to a higher level of intensity of current pulse output. Such a count would obviously have no value since it could not represent the true conditions.

Instead of attempting to count the total of the optical blemishes in the film base by scanning the breadth and length as noted above, a brief reliable procedure and apparatus for its conduct has been devised by which an accurate average count of the optical blemishes per unit of tape area can be determined, the accuracy of which average count has been verified by actual count.

It is therefore an object of this invention to provide apparatus capable of determining the total count of optical blemishes over but a portion of the width of a given length of tape, which total count may be directly related to the probability of blemish occurrence on the average over the entire length of tape in spite of non-uniform distribution of these optical blemishes.

It is a further object of this invention that the previously stated object be attainable in a manner readily adaptable to accurate verification.

It is still another object of this invention to provide interchangeable means for determining the probability of the occurrence of optical blemishes in web materials (such as film base) having varying degrees of freedom from optical blemishes.

These and other objects are achieved by detecting and accurately determining the number of optical blemishes in a predetermined statistically significant portion of a web, as for example a tape, for which it is desired to know the probability of the presence of optical blemishes. This end is achieved by the use of apparatus comprising in combination means for directing a beam of parallel light rays toward the moving web; means for separately focusing both parallel light rays and scattered light rays leaving the web; limiting means, and a photosensitive device, whereby the parallel light rays leaving the web are focused at an obstruction in the direction of travel thereof and the scattered light rays are focused as discrete magnified images at the photosensitive device in all those instances in which admission thereof is not prevented by the limiting means, which permit substantially only one magnified image to be presented in a positive manner at any one time. By counting the discrete pulses emanating from the photosensitive device in response to the impingement thereon of magnified images passed by the limiting means, a count is provided of the total number of optical blemishes in a statistically significant portion of web and thereby the average percentage probability of blemish occurrence along the tape can be determined.

The exact nature of this invention as well as other objects and advantages thereof will be readily apparent from consideration of the following specification relating to the annexed drawings in which:

FIG. 1 is an isometric view illustrating a preferred embodiment of this invention;

FIG. 2 is a diagrammatic representation of the principal involved in the detection of optical blemishes in the apparatus of FIG. 1;

FIG. 3 is a block flow diagram illustrating the overall combination of optical and electrical components for the detection mechanism in the device illustrated in FIG. 1; and FIG. 4 is an exemplary graphic representation of an analysis of the optical blemishes present in a length of polyester film base.

Although, as has been stated above, tapes employing the thermoplastic layer and manner of impressing intelligence thereon may be read-out by either transmitted or reflected light, the principle of this invention is illustrable with either method of optical read-out. The method chosen in this instance is the use of transmitted light.

In the apparatus 10 disclosed in FIGS. 1, 2 and 3, a continuous strip of tape 11 to be examined to detect the presence of optical blemishes is unwound from reel 12 and passes over idle rollers 13, 14, and 16, which position tape 11 accurately for passage through the observation opening 17 between housings 18 and 19. The drive rollers 21 and 22 pull tape 11 through the detection apparatus 10 with the power therefor being supplied by a variable speed motor (not shown) to provide suitable control over the tape speed.

The wind-up reel 23 and supply reel 12 are each driven by separate torque motors (not shown). Supply reel 12 is driven by its torque motor in a manner opposing the unwinding of tape 11 from this reel 12 while take-up reel 23 is driven by its respective torque motor to steadily accumulate that portion of the tape 11 which has passed rollers 21 and 22. The torques applied to reels 12 and 23 are adjusted relative to each other so that the torque on reel 12 has the lesser value but is still large enough to prevent any vibration of tape 11 as it passes from roller 14 to roller 16. The torque on reel 23 is sufficiently greater than the torque on reel 12 to insure the accumulation of successive layers of tape 11 thereon tight enough so that succeeding layers of tape 11 accepted thereby do not slip over one another whereby additional optical blemishes would be impressed on the tape in addition to the number previously ascertained by the detection mechanism. This provision of means for maintaining film strip 11 tightly wound is important since it minimizes the optical noise contributed to the tape 11 during the handling thereof in the detecting apparatus 10. Revolution counter 24 is connected to drive roller 22 to maintain an accurate record of the length of tape 11 which has passed through apparatus 10.

Housings 18 and 19 contain the components operative to detect the optical blemishes in the passing web as tape 11 is conducted through opening 17. Housing 18 contains light source 26, which illuminates that portion of tape 11 located in observation opening 17 at any instant. Several components of the optical system employed are also located in housing 18 cooperating with light source 26 to effect this illumination, these components being source lens 27, source aperture 28, and collimating lens 29. These cooperating elements contained in housing 18 direct parallel rays of light through tape 11 perpendicular to the plane of tape 11.

After passing through tape 11 the parallel rays of transmitted light pass into housing 19 wherein is contained image lens 30. In the absence of optical blemishes in the tape 11 all of the parallel rays will be focused by lens 30 at point 31 on the forward side of dark field stop 32, which serves to obstruct continued passage of these rays of light.

However, in case the portion of advancing film 11 being inspected at any instant contains the aforementioned optical blemishes or imperfections such that the tape is no longer completely uniform and transparent, these imperfections scatter some of the light rays so that these particular light rays are no longer oriented parallel to the rays from the collimating lens 29. As a result, these scattered rays are no longer focused at focal point 31 but proceed past stop 32 and are focused through detector aperture 33 as discrete images of each of the imperfections or blemishes responsible for the scattering of these light rays. The incidence of each of these images is detected by photocell, or photomultiplier, 34 which develops an output pulse signal in response thereto. This electrical pulse of current has a magnitude depending on the intensity of the image and fed in sequence through a clipper circuit (pulse-height analyzer 36, band pass filter 38, and amplifier 39). The amplified modified signal is then fed to an oscilloscope 41, if desired, and/or pulse counter 42 wherein an actual count of the number of electrical pulses received by the clipper circuit is obtained. Since no light reaches the photomultiplier 34 unless optical blemishes are present in film 11 to scatter erstwhile parallel rays of light illuminating the film, a means is provided for detecting the presence of optical blemishes in any given length of film.

Next, by interposing slit or aperture 33 between photocell 34 and lens 30 and making this slit in proportions bearing a given relation to the average size of the images of the optical blemishes and the distance between blemishes so that only rarely does more than one blemish image pass through the slit at any one instant to reach photocell 34, it becomes possible to cumulatively count the number of optical blemishes, which cross slit 33. If this provision is made, a valid count of the number of optical blemishes in a statistically reliable length of tape or web may be obtained and the average percentage of probability of the occurrence of optical blemishes may be calculated, a factor unaffected by the non-uniform distribution of the blemishes. Of course, in the case of a tape material, which is found to have a non-uniform distribution of optical blemishes, it becomes necessary to inspect a longer length of tape to constitute a "statistically reliable" length. In the case of a particular polyester film base, for example, it has been determined that at least a 500 ft. length must be inspected to produce a statistically valid percentage of probability of the occurrence of optical blemishes at any position along the 1350 ft. length of tape constituting a reel. Actually, since the procedure is so rapidly executed it is convenient to inspect the full reel.

Since various film base materials vary with respect to the concentration of optical blemishes thereon, different size slits are required for use with different materials being inspected. In each instance it becomes necessary to determine by examination the average size of the optical blemishes and the approximate closest distance between adjacent particles. From this information a slit may be chosen which permits only an insignificant number of multiple simultaneous image receptions by photocell 34 so that each optical blemish image produced is registered one time, no more and no less.

A mechanism for providing a selection of aperture sizes for slit 33 is shown in FIG. 1. Cylindrical shielding tube 44 is mounted covering photocell 34 and spaced therefrom. Around the circumference of tube 44 are disposed a series of slits 33 of various proportions penetrating the wall of tube 44. These slits 33 may be selectively brought into registry between housing 19 and photocell 34, each of the slits having different dimensions to permit the detection of separate categories of average sizes of optical blemish images and/or to accommodate various spacings thereof. Rotation of tube 44 to select the desired size slit 33 may be effected from the outside of light-tight enclosure 47, housing photocell 34 and the pulse detecting equipment. This adjustment from outside enclosure 47 is enabled by rotatably mounting tube 44 in wall 48 in light-tight seal 49 with a portion of tube 44 extending beyond wall 48 to permit grasping and rotation thereof. The other end of tube 44 is preferably rotatably mounted on a wall of the box 51 which houses the clipper circuitry receiving the pulse output of photocell 34 and from which photocell 34 extends.

By way of example, to illustrate the practice of this invention, a polyester film base examined to determine the optical blemish count thereof. By photographically recording, observing and measuring the actual random sizes of the scattered light images cast by the optical blemishes in the plane of photocell 34 when the polyester film base was inserted in the opening 17, it was determined that the average size of the optical blemish images on the photocell 34 was about 1.5 mm. in diameter. It was also determined during this examination that it was extremely rare to encounter the occurrence of two blemish images adjacent each other within the distance of three or four image diameters (about 4.5 mm. to about 6.0 mm.) This information indicated that for this particular film base the probability of blemish occurrence could most accurately be determined by registering the passage of blemish images through a slit 33 in tube 44 having dimensions of 1.5 mm. x 4.5 mm. with the smaller dimension extending in the direction of passage of tape 11 and the longer dimension extending in the direction of the width of tape 11. As may be seen, the selection of slit proportions is intended to enable the sequential registry one at a time of all the optical blemishes present in a narrow ribbon-like area extending the sample length of tape.

Since the aforementioned size of the slit 33 is based upon the average size of the blemish image and the close inter-image spacing as magnified by the optical system, the dimension of the slit in the direction of the length of the tape (i.e. 1.5 mm.) when divided by the optical magnification and compared with the actual length of tape examined will yield the number of individual slit lengths to be found in the test length of tape. In this instance, the optical magnification of the system was 21× and it was found that 5,680,000 individual slit lengths are contained in 1350 feet of tape 11. It was also determined that the area that would be covered by 15,100 average size optical blemishes corresponds to the area of a 16 millimeter picture frame.

After blemish counts have been made by running a reasonable length of tape 11 for statistical reliability (in this case 1350 ft.) through the observation opening 17 and cumulatively counting by means of the pulse counter 41 the number of optical blemish images which were focused through slit 33 in cylindrical tube 44, the average percentage probability of blemish occurrence at any place along tape 11 was determined by dividing this total count by 4.5/1.5 and by 5,680,000 and then by multiplying by 100. This, in effect amounts to finding the ratio of actual counts to the total number of counts possible and expressing the value as a percent. The unusual aspect of this accomplishment is that such as procedure is applicable to tapes along which the optical blemishes are non-uniformly distributed.

By dividing the average percentage probability by 100 and then multiplying by 15,100 (images per picture frame), the average number of blemishes per 16 millimeter frame of this tape is obtained. The number of blemishes per frame of film has been confirmed by photographing many frames of the film under magnification and laboriously counting the number of blemish images occurring in each 16 millimeter frame. By repeating this actual count of blemish images in a minimum of 20 frames of film the validity of the procedure described herein has been and can at any time be verified. Actually, the more frames of film on which the verifying count is made, the closer the average count approaches the percentage probability provided by the above-outlined procedure. However, this is a lengthy and vexing task.

Because of the development of this method and apparatus for accurately and reproduceably counting these blemishes, other aspects of the detecting apparatus, that is, the optical system and detecting circuitry becomes more meaningful. For example, counting only those individual pulses which have an amplitude of greater than a certain selected intensity can be effected by an appropriate voltage setting for the pulse-height analyzer wherein only those blemish images having intensities greater than the cutoff intensity are recorded. Since scattered light intensity relates to some dimension or property of the optical blemish as well as to some properties of the tape material surrounding the blemishes, those blemishes causing the more intense images are in some respect similar to each other and different from those causing the less intense images permitting the analysis of the causes of certain optical noise by the use of a graphic display of the counts per frame plotted against the cutoff intensity.

Such a graph is shown in FIG. 4, this particular curve showing an analysis of the count of optical blemishes in the polyester film base as a function of intensity of scattered light. As observed therein, two plateau areas 52 and 53 occur in an otherwise steep curve. The presence of these plateau areas shows that in this particular tape the blemishes observed are not caused at random by a number of different blemish-generating processes, but rather are caused predominantly by two principal blemish-generating factors, each one responsible for generating a large portion of the optical blemishes over a limited range of intensities of scattered light. Once armed with such an analysis the contributing factors may be more easily ascertained and measures may be taken to cure the deficiencies and to determine the success of such measures by plotting further curves for comparison with the original.

The excessive contribution of optical noise to the tape base during manufacture of thermoplastic tape will also be susceptible of quicker detection and evaluation, both qualitative and quantitative, by conduct of this method and by the use of this apparatus.

Thus, by the introduction in combination with a dark field detection apparatus of this novel means for insuring the counting of single, discrete images of light scattered by optical blemishes during the path of travel of these light rays in a medium or against a surface thereof a meaningful, statistically verifiable and reproducible percentage probability of blemish occurrence can be secured.

In those cases in which the surface of a reflector, alone or in combination with a transparent layer, is to be inspected for optical blemish content this method is equally applicable and, whereas the arrangement of components relative to each other will vary in keeping with the fact that reflected light is under consideration, the novel construction and disposition of properly dimensioned slits or windows relative to the photocell for the registry of the images of the optical blemishes would remain the same.

What we claim as new and desire to secure by Letters Patent of the United States is:

1. Apparatus for detecting and accurately counting the optical blemishes of a known, statistically significant portion of moving web comprising:
   (a) a source of illumination,
   (b) a dark field optical system,
      (1) said dark field optical system being in two sections, a first section disposed between said source and the path of travel for said moving web and a second section in the path of parallel light rays leaving said web,
   (c) a photosensitive device located approximately in line with said second section in the focal plane thereof for exposure to scattered light rays exiting from said second section,
      (1) said photosensitive device generating discrete pulses of current in response to exposure to magnified images formed by said scattered rays of light,
   (d) means located between said second section and said photosensitive device for controlling the admission of such magnified images to said photosensitive device,
      (1) said control means being an aperture dimensioned so that substantially all magnified images admitted to said photosensitive device are presented in a positive manner one at a time,
   (e) means actuated by the discrete pulses of current from said photosensitive device for counting said discrete pulses of current,
whereby an accurate count can be provided of the magnified images received by said photosensitive device and thereby of the total count of the number of optical blemishes in a statistically significant length and width of the moving web from which the average percentage probability of blemish occurrence at any station along the web can be determined.

2. Apparatus for detecting and accurately counting optical blemishes as recited in claim 1 wherein the control means may be selectively adjusted to different size apertures.

3. Apparatus for detecting and accurately counting optical blemishes as recited in claim 1 wherein light rays passing from the first section to the second section pass through the path for the moving web.

4. Apparatus for detecting and accurately counting optical blemishes as recited in claim 1 wherein the means for counting includes means for counting only those pulses of current having an amplitude greater than some established minimum value.

5. Apparatus for detecting and accurately counting the optical blemishes of a known, statistically significant portion of a moving web comprising:
   (a) means mounted adjacent the path of travel of said web for directing a beam of parallel light rays toward the web,
   (b) means located in the path of parallel light rays leaving said path of travel for focusing light rays leaving said path of travel,
      (1) said focusing means separately focusing parallel light rays and scattered light rays leaving said path of travel, said parallel light rays being focused at an obstruction in the direction of travel of the parallel rays and said scattered light rays being focused as discrete magnified images to the far side of said obstruction from said focusing means,
   (c) a photosensitive device mounted in the region of focusing of the scattered rays of light,
      (1) said photosensitive device generating discrete pulses in response to exposure thereof to magnified images formed by the scattered rays of light,
   (d) means located between said focusing means and said photosensitive device for limiting the admission of such magnified images to said photosensitive device to the presentation in a positive manner of substantially one magnified image at a time, and
   (e) means actuated by the discrete pulses from said photosensitive device for counting said discrete pulses,
whereby an accurate count can be provided of the magnified images received by said photosensitive device and thereby of the total count of the number of optical blemises in a statistically significant length and width of the moving web from which the average percentage probability of blemish occurrence at any station along the web can be determined.

6. Apparatus for detecting and accurately counting the optical blemishes of a known, statistically significant portion of a moving web as recited in claim 5 wherein the limiting means is a shielding element interposed between the focusing means and the photosensitive device, said shielding element having an aperture therethrough positioned in the line of sight between said focusing means and said photosensitive device.

7. Apparatus for detecting and accurately counting the optical blemishes of a known, statistically significant portion of a moving web as recited in claim 6, wherein the aperture is rectangular in plan view having one dimension corresponding substantially to the average size of a single magnified image formed by the scattered light rays at the photosensitive device and having a second dimension corresponding substantially to the average size of a single magnified image plus the average magnified distance to the nearest such magnified image.

References Cited by the Examiner

UNITED STATES PATENTS

| | | | |
|---|---|---|---|
| 2,735,331 | 2/1956 | McMaster et al. | 88—14 |
| 3,081,665 | 3/1963 | Griss et al. | 250—219 |
| 3,094,625 | 6/1963 | Hendrick | 250—218 |
| 3,202,043 | 7/1965 | Galey et al. | 250—219 |

RALPH G. NILSON, *Primary Examiner.*

WALTER STOLWEIN, *Examiner.*

J. D. WALL, *Assistant Examiner.*